United States Patent [19]

Solomon et al.

[11] Patent Number: 4,615,954

[45] Date of Patent: Oct. 7, 1986

[54] FAST RESPONSE, HIGH RATE, GAS DIFFUSION ELECTRODE AND METHOD OF MAKING SAME

[75] Inventors: Frank Solomon, Great Neck, N.Y.; Charles Grun, Matawan, N.J.

[73] Assignee: ELTECH Systems Corporation, Boca Raton, Fla.

[21] Appl. No.: 655,129

[22] Filed: Sep. 27, 1984

[51] Int. Cl.$^4$ .................. H01M 12/06; H01M 4/96
[52] U.S. Cl. ................................... 429/27; 429/42; 429/44
[58] Field of Search ............... 429/42, 41, 43, 40, 429/45, 44, 27; 252/182.1; 204/294, 292

[56] References Cited

U.S. PATENT DOCUMENTS

| | | | |
|---|---|---|---|
| 3,385,780 | 5/1968 | Feng | 204/294 |
| 3,462,307 | 8/1969 | Voorhies et al. | 429/29 |
| 3,553,022 | 1/1971 | Gregory | 429/42 |
| 3,668,014 | 6/1972 | Katsoulis et al. | 429/42 |
| 4,255,498 | 3/1981 | Yoshida | 429/27 |
| 4,337,139 | 6/1982 | Gestaut et al. | 429/42 X |
| 4,357,262 | 11/1982 | Solomon | 429/42 X |
| 4,362,790 | 12/1982 | Blauchart et al. | 429/42 |
| 4,440,617 | 4/1984 | Solomon | 429/42 X |
| 4,447,505 | 5/1984 | Blanchart | 429/42 |
| 4,456,521 | 6/1984 | Solomon et al. | 204/292 |
| 4,459,197 | 7/1984 | Solomon | 204/292 |
| 4,468,362 | 8/1984 | Solomon | 264/127 |

*Primary Examiner*—Anthony Skapars
*Attorney, Agent, or Firm*—John J. Freer

[57] ABSTRACT

Disclosed are gas fed, porous electrodes capable of steady, high current density operation for practical periods of service, e.g. as oxygen cathodes in metal-air batteries. The subject electrodes feature at least two bonded composite layers, one of which is a form-stable, conductive wetproofing layer while the other is an unusually thin active layer containing active carbon particles predominantly between about 2 and about 20 micrometers and having a high internal surface area, e.g. a B.E.T. surface area of over 1000 m$^2$/gram. A simple and highly successful method of preparing such electrodes is also disclosed, which avoids the necessity of separately forming and handling the thin active layer.

19 Claims, No Drawings

FAST RESPONSE, HIGH RATE, GAS DIFFUSION ELECTRODE AND METHOD OF MAKING SAME

FIELD OF THE INVENTION

This invention relates to gas diffusion electrodes for use in electrolytic devices. More particularly, it is directed toward oxygen-containing gas fed, porous electrodes capable of high current density operation with good durability; for example, for service as oxygen or air cathodes in metal-air batteries.

BACKGROUND OF THE INVENTION

Fuel cells and metal-air batteries have been known for many years. However, commercial exploitation has been slower than expected due to their generally bulky structures and the difficulties encountered in attaining adequate power densities and reasonably sustained performance. Accordingly, much effort has been expended in developing more compact cell designs and more efficient electrodes for service in the harsh chemical environments represented by the acid or alkaline electrolytes used therein.

Porous composite electrodes containing various electroconductive and catalytic particles have often received consideration for service as oxygen cathodes in such batteries and fuel cells. Representative cathodes of this character are described for example, in U.S. Pat. Nos. 3,385,780; 3,462,307; 3,553,022; and 3,668,014.

Although considerable progress has already been made in adapting such porous composite electrodes for use in electrochemical devices, the difficult problem of achieving and maintaining a controlled balance in permeability to both the liquid electrolyte and the oxygen containing gas has led to premature failures, such as blistering and delamination, under more demanding service conditions. For example, in metal-air batteries having cell potentials of about 2 volts, available porous, carbon based oxygen cathodes have not heretofore been capable of sustained performance at high current densities (i.e. substantially above about 400 milliamps per sq. cm.) for much more than a full hour at best. One of the most common causes of oxygen cathode failure is believed to be flooding of the porous cathode structure by electrolyte, but attainable current density can also be reduced by excessive gas percolation therethrough and/or depletion of catalytic activity therein.

OBJECTS OF THE INVENTION

A primary object of our invention is the provision of porous, composite oxygen cathodes which will perform at high current densities continuously for at least several hours in a metal-air battery having a cell potential of about 2 volts or more. A corollary object is to increase the resistance of said cathode to flooding or structural failures, without causing poor initial wetting by electrolyte or sluggish response upon activation.

Another object is to provide such oxygen cathodes which will operate satisfactorily when fed with either oxygen or air.

Secondary objects are to provide such cathodes which are resistant to percolation of gas therethrough, and to protect the catalysts used therein from inactivation or deterioration via the cell environment. Further objects will become apparent from the detailed disclosures which follow.

SUMMARY OF THE INVENTION

In line with the above objects, the oxygen cathode of this invention comprises: a form-stable, electrically conductive, wetproofing layer composed essentially of a heat sintered, intimately consolidated mixture of carbon black and particulate hydrophobic polymeric binder derived predominantly from tetrafluoroethylene, having at least one anisometric reinforcing material incorporated therein; and, directly adhered to one surface of said wetproofing layer, an active layer having a thickness between about 0.03 and about 0.10 millimeter and composed essentially of a mixture of catalyzed particles of an active carbon predominantly of a size between about 2 and about 20 micrometers (and preferably about 5 to about 10 micrometers) and having a B.E.T. surface area of over about 1000 m$^2$/gram and particles of a polymer of tetrafluoroethylene.

Ideally, the oxygen cathode is prepared by a simple and economical process comprising:

(a) dispersing carbon black and particles of a hydrophobic polymeric binder in an alcoholic liquid, optionally with the further addition of a minor proportion of fine, short-chopped fibers, to form a well mixed particulate suspension;

(b) removing most of the alcoholic liquid from said suspension by filtering, centrifuging, evaporation or other liquid separation techniques to leave a mud-like, damp-solids mass of well mixed carbon black and hydrophobic binder particles, optionally with a minor content of said fibers;

(c) forming said damp-solids mass into a dry, form-stable wetproofing layer by application of heat and pressure, optionally while incorporating a layer of fine mesh material therein;

(d) heating the dry, form-stable wetproofing layer from step (c) to a temperature above about 325°C. while applying pressure thereto, thereby causing the hydrophobic binder particles to sinter and bond with other particulate matter in said layer;

(e) forming a well mixed dispersion in alcoholic liquid of particles of a polymer of tetrafluoroethylene and precatalyzed particles of active carbon having a B.E.T. surface area of over about 1000 m$^2$/gram and predominantly ranging between about 2 and about 20 micrometers in size;

(f) subjecting said well mixed dispersion from step (e) to filtration using the sintered form-stable wetproofing layer from step (d) as the filter medium to deposit over one face of said layer a thin coating of well mixed particles of said catalyzed active carbon and said polymer of tetrafluoroethylene amounting to about 2 to about 6 milligrams of said well mixed particles per square centimeter of said face; and (g) drying said coating in place by application of heat and pressure, thereby forming said oxygen cathode having an active layer having a thickness of between about 0.03 and about 0.10 millimeter bonded to said form-stable wetproofing layer.

In one especially preferred embodiment of the invention, a fine gauge mesh or gauze is embedded in the wetproofing layer as an "anisometric" reinforcing material. As defined herein an "anisometric" mesh is one wherein the individual elements of the mesh are anisometric whether or not the mesh pattern itself is essentially symmetrical. Although this mesh or gauze may be fabricated of any tough and sufficiently inert stabilizing material, corrosion resistant metal or other electrically conductive material is ideal since such mesh will also function as a current distributor. A very thin expanded metal sheet can be used in similar manner instead of a metal mesh or gauze.

DESCRIPTION OF THE INVENTION

The success of the present invention in supplying oxygen cathodes which are sufficiently resistant to electrolyte flooding or other breakdowns to perform in metal-air batteries for more than several hours at high current densities results primarily from the use of an unusually thin active layer of simple composition which provides both controlled permeability and balanced hydrophobicity. Thus, said active layer is not over about 0.1 millimeter in thickness and is composed essentially of an intimate mixture of precatalyzed particles of active carbon predominantly (i.e. at least about 55% by weight) within a particle size range of about 2 to about 20 (preferably about 5 to about 10) micrometers and having a B.E.T. surface area above about 1000 m$^2$/gram and a particulate tetrafluoroethylene polymer.

The addition of fugitive pore formers, such as sodium carbonate or ammonium benzoate, is unnecessary and is preferably avoided in the compositions used to form the active layers of our oxygen cathodes, since the balanced permeability desired is readily achieved and controlled consistently using the above described particulate mixtures. The precatalyzed particles of active carbon may contain between about 5 and about 25% of a catalyst effective in promoting reduction of oxygen. Among the wide number of active catalysts known to be suitable are platinum and palladium blacks and other platinum group metals and compounds, as well as silver, copper, cobalt and other metals. One type of catalyst which is particularly preferred in the present invention comprises macrocyclic organic compounds of cobalt, such as cobalt tetramethoxyphenylporphyrin. In order to optimize its activity, this type of catalyst should be heat treated in a nitrogen atmosphere after being adsorbed on the active carbon. For example, excellent results are obtained by heating said cobalt macrocyclic in this manner for about 1-3 hours at about 700° to 900° C. Regardless of the particular catalyst employed the weight proportion of catalyzed active carbon to tetrafluoroethylene (TFE) polymer should be between about 7 to 3 and about 9 to 1.

Using such simple composite mixtures to fabricate our active layers, controlled hydrophobicity and evenly balanced permeability are obtained particularly when the thickness of the active layer in the subject cathodes is between about 0.05 and about 0.08 millimeters. Such active layers are so thin and fragile as to discourage handling thereof as separate layers or sheets in fabricating electrodes of practical sizes. Accordingly, a vital corollary factor in the practical realization of durable oxygen cathodes for high energy density service in accordance with the present invention is the provision of a sturdy, form-stable wetproofing layer to which said unusually thin active layer is adhered.

This wet-proofing layer is electrically conductive and is usually substantially thicker than said active layer. In addition to the intimate mixtures of carbon black and tetrafluoroethylene binder particles used in its formation, it should be further strengthened by including at least one anisometric reinforcing material therein and by heat sintering under pressure. Thus, said wetproofing layer is preferably above about 0.1 millimeters in thickness. Also, the carbon black employed therein should have a particle size between 50 and about 3000 Angstroms and preferably will be a highly conductive grade of carbon black such as an acetylene black. Most acetylene blacks average between about 300 and about 500 Angstroms in size. The preferred particulate polymer for use therewith is polytetrafluoroethylene (commercially available from DuPont under the "TEFLON" trademark). The anisometric reinforcing material can comprise short, chopped fibers of fine denier with L/D ratio of at least 10, and/or one or more layers of fine gauge mesh or gauze material. Particularly suitable are carbon or graphite fibers from about 1 to about 10 millimeters in length and about 5 to 100 micrometers in diameter, as well as mesh materials about 50 to about 200 micrometers thick, particularly closely woven metallic mesh materials which greatly improve current distribution in the finished electrode. For example, metallic meshes having between about 10 and about 20 individual wires per centimeter across both warp and fill directions are ideal.

The proportions in which the various components are incorporated in the wetproofing layer may be varied considerably as long as a sturdy, form-stable electrically conductive layer is produced. Thus, the weight proportion of carbon black to tetrafluoroethylene binder particles should lie between about 3 to 2 and about 4 to 1, while the fibers used as reinforcement material should amount to between about 3% and about 25% of the combined weight of the carbon black and binder. Reinforcing mesh materials will usually constitute 10 to 25% by volume of the wetproofing layer. However, on a weight basis, the preferred electrically conductive metallic wire meshes may well account for over half of the total weight of the wetproofing layer. Wetproofing layers acceptable for the needs of this invention have been disclosed in U.S. Pat. No. 4,468,362, the contents of which are hereby incorporated by reference herein with the same full effect as if they were actually repeated herein. If no mesh reinforcement is used, then the proportion of reinforcing fibers incorporated in the wetproofing layer should be at least about 5% of the combined weight of the carbon black and binder.

Because of the inherent weakness of the unusually thin active layers per se, successful production of the finished oxygen cathode of this invention is reliably accomplished by a unique but highly practical procedure wherein the sturdy, form-stable wetproofing layer is completely fabricated first (including an embedded metallic mesh current distributor, if one is needed or desired therein), and, after heat sintering under pressure (e.g. 10 to 1000 psi), using said wetproofing layer as a filter medium on which the composite particulates of which the active layer is to be formed are deposited from a well mixed dispersion in an alcoholic liquid by filtering same through said wetproofing layer. The alcoholic liquid employed to produce said dispersion should contain at least 50% by volume of a lower alkanol, preferably one containing not more than 6 carbon atoms per molecule. Water or other fairly volatile, inert polar liquids can be used as diluents in said alcoholic liquid. The amount of said dispersion filtered through said wetproofing layer should be sufficient to deposit a coating of somewhere between about 2 and about 6 milligrams per square centimeter of geometric area on the face of said wetproofing layer, depending on the exact thickness desired for the active layer being formed.

Once said coating of active layer particulates has been deposited on said wetproofing layer, it is only necessary to dry same thoroughly under steady compression, preferably using temperatures somewhat above 100° C. and pressures of between about 500 and about 3000 psi. It is not necessary, and generally is not preferred, to heat sinter the active layer.

Although not essential to the production of a fast response, high current density oxygen cathode with good durability, it is, of course, permissible and may be desirable if the extra expense is warranted, to apply to the exposed face of the active layer of said cathodes thin coatings of additional materials, such as catalysts and/or hydrophilic substances. One exemplary surface treatment of this type involved application of a very thin coating of silver particles to provide special catalytic effects in the presence of hydrogen peroxide containing electrolytes, as well as improving the resistance of the oxygen cathode to percolation of gas therethrough into the electrolyte. It was found that a suitable coating of silver could be formed by depositing on the exposed face of said active layer about 5 to 15 milligrams of silver particles, predominantly between about 0.1 and about 1 micrometer in size, per sq. cm. from a liquid dispersion thereof using a filtration procedure similar to that used in forming the active layer upon the finished wetproofing layer. Generally speaking the thickness of such an auxiliary outer layer may be about 20 to about 50 micrometers, and preferably is thinner than the active layer of the electrode in question.

The specific examples which follow are provided to illustrate the invention in more detail and to demonstrate some of the valuable advantages obtained therefrom.

EXAMPLE A

Preparation of Fiber Reinforced Wetproofing Layer

A well mixed aqueous dispersion of 70 parts by weight of acetylene carbon black (SHAWINIGAN TM Black) to 30 parts by weight of particulate polytetrafluoroethylene (TEFLON TM 30 dispersion) was filtered in a Buchner funnel, and the wet solids were washed thoroughly with isopropyl alcohol. About 4.4 grams (dry basis) of the alcohol washed mixture of PTFE and acetylene black were then dispersed in about 350 ml of isopropyl alcohol along with 0.23 grams of one-eighth inch (0.032 cm) long carbon fibers (PANEX TM CF 30), using an Osterizer TM blender. The mixed solids in this alcoholic dispersion were then formed into a uniform, mud-like layer by filtering enough of said dispersion to deposit about 18 milligrams (dry basis) of said solids per sq. cm. on a separable filter medium. The resulting damp layer of solids was dried at about 115° C. while compressing same at 500 psi, before removing said filter medium. Finally, the dry consolidated layer having a thickness of about 0.3 mm was heated to about 325° C. for a few minutes under 200 psi pressure in order to sinter the PTFE particles, thereby bonding the mixed particulates together into a form-stable, electrically conductive web or sheet.

EXAMPLE B

Fiber Reinforced Wetproofing Layer (with metal mesh embedded therein)

Example A was repeated except that, before compressing and drying the damp layer of solids at about 115° C. and 500 psi, a coextensive layer of woven metal wire mesh was placed on top of said damp layer so that it became embedded in the resulting dry consolidated layer. Said metal mesh was made of silver plated, nickel coated copper wire of about 0.12 mm in diameter, (with about 20 individual wires per centimeter across both the warp and fill directions), and weighed approximately 40 milligrams per square cm.

EXAMPLE C

Fiber-Free Wetproofing Layer (with metal mesh embedded therein)

Example B was repeated except no fibers were included in the alcoholic dispersion of PTFE and acetylene black.

EXAMPLE 1

A ball milled and classified activated carbon having a B.E.T. surface area of about 1100 $m^2/g$ and about 60% by weight of which is in the particle size range of about 2 to about 20 micrometers was impregnated with platinum by treatment with aqueous solutions of $H_3Pt(SO_3)_2OH$ and $H_2O_2$ following a procedure much like that described in Example 1 of U.S. Pat. No. 4,044,193, except that the proportions of reagents were adjusted to produce a catalyzed active carbon containing about 20% platinum by weight. This platinized active carbon was recovered by filtration, washing and drying at about 140° C. in air.

Twenty parts by weight of said platinized active carbon was thoroughly dispersed in about 300 ml of water using an Osterizer TM blender and about an equal quantity of water containing enough "TEFLON TM 30" to provide 5 parts by weight of PTFE was slowly blended therewith. After the blended solids mixture was filtered out and washed with alcohol, it was redispersed in isopropanol to produce a suspension containing about 10 grams of the well mixed particles of platinized active carbon and PTFE per liter.

Varying amounts of this isopropanol suspension were then filtered through four equal-sized square sections cut from the reinforced and heat sintered wetproofing sheet made in EXAMPLE B hereinabove, said amounts being adjusted to coat said four sections with the following loadings of mixed particles from said suspension:

B-1 = 11.0 milligrams/$cm^2$
B-2 = 3.4 milligrams/$cm^2$
B-3 = 2.3 milligrams/$cm^2$
B-4 = 1.7 milligrams/$cm^2$ The resultant coated sections were then compressed at about 500 psi while heating to about 100° C. and finally pressed at about 3000 psi without further heating to yield four finished electrode samples.

The durability of these sample electrodes for operation as oxygen cathodes in an environment simulating a metal-air battery was measured by the following standardized procedure.

The test cell was filled with 4 molar LiOH and provided with a chemically inert nickel counter anode, a heater, a stirrer, a thermostat and a D.C. power source. On one side of said cell, a cathodic mount was provided to hold the sample electrodes directly facing toward said counter anode and including a separate gas compartment to the rear of said mount and a Luggin capillary for communicating between the test electrode and a standard Hg/HgO reference electrode, so that the half cell potential of the test electrode operating as an oxygen cathode could be tracked during the test.

The present series of tests was run at 25° C. using a current density of 500 milliamps per sq. cm. while circulating four times the theoretically needed quantity of air (purified of $CO_2$) through the gas compartment behind the test electrode with the following results.

| SAMPLE ELECTRODE | ACTIVE LAYER THICKNESS | TIME OF STEADY OPERATION @ 500 ma/cm$^2$ |
| --- | --- | --- |
| B-1 | 0.20 mm | 10 minutes |
| B-2 | 0.06 mm | 6 hours |
| B-3 | 0.04 mm | 5 hours |
| B-4 | 0.03 mm | 3 hours |

EXAMPLE 2

Again using square sections cut from the reinforced wetproofing sheet of Example B, a similar series of test electrodes were made as in Example 1 except that the active carbon was precatalyzed with cobalt tetramethoxyphenyl porphyrin in proportions of 1 part by weight of said porphyrin to 9 parts of active carbon, and then heat treated in $N_2$ gas at about 800° C. for about 2 hours to produce the starting catalyzed active carbon component. The sample electrodes were tested as oxygen cathodes as in Example 1 except at 60° C., and the results of their durability testing are summarized in the following table:

| SAMPLE ELECTRODE | ACTIVE LAYER: SOLIDS LOADING | THICKNESS | STEADY OPERATION @ 500 ma/cm$^2$ |
| --- | --- | --- | --- |
| B-5 | 6.6 mg/cm$^2$ | 0.12 mm | 1 hour |
| B-6 | 3.6 mg/cm$^2$ | 0.065 mm | 6.5 hours |
| B-7 | 3.3 mg/cm$^2$ | 0.058 mm | 11.5 hours |

EXAMPLE 3

Three isopropanol suspensions designated (X,Y and Z) were made as in Example 2, each containing the same proportions of PTFE and 10% cobalt catalyzed active carbon particles and the only difference being that the starting active carbon particles were predominantly within much narrower size ranges. These suspensions were used to form active layer coatings each containing about 3.8 mg/cm$^2$ of the solids mixture in said suspensions, using the filtration technique described in Examples 1 and 2 and additional square sections of the same reinforced wetproofing sheet made in Example B. The resulting coated sections of the wetproofing sheet were processed as in Example 1 to obtain three additional test electrodes, each having an active layer thickness of about 0.07 mm. The results of testing these electrodes as oxygen cathodes under the same conditions as in Example 2 were as follows:

| SAMPLE ELECTRODE | PREDOMINANT SIZE RANGE | STEADY OPERATION @ 500 ma/cm$^2$ |
| --- | --- | --- |
| B-X | >2 and <10 μm | 7 hours |
| B-Y | >2 and <5 μm | 8 hours |
| B-Z | >5 and <10 μm | 19 hours |

The above illustrative examples are provided to give a more complete and detailed understanding of the practice of our invention and to point out presently preferred embodiments and some special advantages thereof. Accordingly, those skilled in the art will now be able to make various modifications in the specific conditions and employ other equivalent components to practice this invention, all of which variations are intended to be covered by the claims appended hereto.

What is claimed is:

1. A fast response, high current density oxygen cathode comprising: a form-stable, electrically conductive, wetproofing layer composed essentially of an intimate, consolidated and heat sintered mixture of carbon black and particulate hydrophobic polymeric binder derived predominantly from tetrafluoroethylene, having at least one anisometric electroconductive reinforcing material incorporated therein; and, directly adhered to one surface of said wetproofing layer, a porous active layer having a thickness between about 0.03 and about 0.1 millimeter and composed essentially of a mixture of particles of a polymer of tetrafluoroethylene and cobalt catalyst-containing particles of an active carbon predominantly of a size between about 2 and about 20 micrometers and having a B.E.T. surface area of over about 1000 m$^2$/gram.

2. An oxygen cathode as in claim 1 wherein said reinforcing material comprises at least one coextensive layer of fine mesh or gauze having a thickness of between about 50 and about 200 micrometers.

3. An oxygen cathode as in claim 1 wherein said reinforcing material comprises short, chopped fibers of fine denier.

4. An oxygen cathode as in claim 3 wherein said fibers are between about 1 and about 10 millimeters in length and about 5 to 100 micrometers in diameter.

5. An oxygen cathode as in claim 4 wherein said fibers are carbon or graphite.

6. An oxygen cathode as in claim 1 wherein said carbon black has a particle size between about 50 and about 3000 Angstroms.

7. An oxygen cathode as in claim 6 wherein said carbon black is an acetylene carbon black.

8. An oxygen cathode as in claim 1 wherein said cobalt catalyst-containing particles of active carbon contain between about 5% and about 25% by weight of a cobalt effective in promoting reduction of oxygen.

9. An oxygen cathode as in claim 8 wherein said catalyst is a macrocyclic organic compound of cobalt.

10. An oxygen cathode as in claim 9 wherein said catalyst is cobalt tetramethoxyphenylporphyrin (which is heat treated after being deposited on said active carbon).

11. An oxygen cathode as in claim 1 wherein the thickness of said active layer is between about 50 and about 80 micrometers.

12. An oxygen cathode as in claim 1 wherein polytetrafluoroethylene is the predominant polymeric constituent in both the wetproofing and the active layers.

13. An oxygen cathode as in claim 1 wherein a thin outer layer of submicron sized silver particles is deposited on the exposed face of said active layer.

14. An oxygen cathode as in claim 13 wherein said layer of silver particles is thinner than said active layer.

15. An oxygen cathode as in claim 1 wherein said active carbon particles are predominantly in the range between about 5 and about 10 micrometers.

16. An oxygen cathode as in claim 1 wherein said wetproofing layer is thicker than 0.1 millimeter.

17. An oxygen cathode as in claim 1 wherein said reinforcing material is fibrous and it accounts for between about 3% and about 25% of the combined weight of carbon black and binder and the weight proportion of carbon black to hydrophobic polymeric binder therein is between about 3 to 2 and about 4 to 1, while the weight proportion of catalyzed active carbon to polymer particles in said active layer is between about 7 to 3 and about 9 to 1.

18. An oxygen cathode as in claim 1 wherein said active layer is also heat sintered.

19. A metal-air battery contining an oxygen cathode as defined in claim 1.

* * * * *